(12) United States Patent
Kuroki

(10) Patent No.: US 11,444,547 B2
(45) Date of Patent: Sep. 13, 2022

(54) POWER CONVERSION APPARATUS

(71) Applicant: FANUC CORPORATION, Yamanashi (JP)

(72) Inventor: Wataru Kuroki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/007,371

(22) Filed: Aug. 31, 2020

(65) Prior Publication Data

US 2021/0075336 A1 Mar. 11, 2021

(30) Foreign Application Priority Data

Sep. 5, 2019 (JP) .............................. JP2019-162023

(51) Int. Cl.
*H02M 5/458* (2006.01)
*H02M 7/219* (2006.01)

(52) U.S. Cl.
CPC ......... *H02M 7/219* (2013.01); *H02M 5/4585* (2013.01)

(58) Field of Classification Search
CPC ..................... H02M 5/40–48; H02M 7/02–40
See application file for complete search history.

(56) References Cited

U.S. PATENT DOCUMENTS

| 10,008,952 | B1* | 6/2018 | Hu | H02M 5/42 |
| 2013/0003432 | A1* | 1/2013 | Boni | H02M 7/25 363/126 |
| 2014/0211524 | A1* | 7/2014 | Guyomard | H02M 1/36 363/49 |
| 2019/0299793 | A1* | 10/2019 | Kim | H02M 1/32 |
| 2020/0023746 | A1* | 1/2020 | Kim | H02M 1/4216 |

FOREIGN PATENT DOCUMENTS

| JP | 60-071477 A | 4/1985 |
| JP | 2012-165509 A | 8/2012 |

* cited by examiner

*Primary Examiner* — Peter M Novak
(74) *Attorney, Agent, or Firm* — Robert P. Michal, Esq.; Carter, DeLuca & Farrell LLP

(57) ABSTRACT

A power conversion apparatus includes: a converter that includes input terminals and switching elements corresponding to respective phases of a three-phase AC power supply and converts an AC voltage of the three-phase AC power supply into a DC voltage, and a capacitor that smooths the DC voltage converted by the converter. A single-phase AC power supply or a DC power supply is connected to two of the input terminals corresponding to any two of the three phases of the converter while a passive element is provided to connect the remaining one of the input terminals corresponding to the phase to which the single-phase AC power supply or the DC power supply is not connected, with one terminal of the capacitor.

6 Claims, 4 Drawing Sheets

US 11,444,547 B2

POWER CONVERSION APPARATUS

CROSS-REFERENCE TO RELATED APPLICATION

This application is based upon and claims the benefit of priority from Japanese Patent Application No. 2019-162023 filed on Sep. 5, 2019, the contents of which are incorporated herein by reference.

BACKGROUND OF THE INVENTION

Field of the Invention

The present invention relates to a power conversion apparatus for converting an AC voltage supplied from an AC power supply into a DC voltage or rectification.

Description of the Related Art

Japanese Laid-Open Patent Publication No. 2012-165509 discloses a power conversion apparatus for converting three-phase AC voltage into a DC voltage, in which a single-phase power supply prevents supply is used to realize an inrush current.

SUMMARY OF THE INVENTION

However, when a single-phase power supply is used as the power supply in the power conversion apparatus capable of converting a three-phase AC voltage into DC voltage, an unconnected phase of the three-phase rectifier is in an idle state (which will be also referred to as an idle circuit) is present, and this has been conventionally unused and wasted.

It is therefore an object of the present invention to provide a power conversion apparatus which can effectively use an idle circuit.

A power conversion apparatus includes: a converter (12) including input terminals and switching elements corresponding to respective phases of a three-phase AC power supply, and configured to convert an AC voltage of the three-phase AC power supply into a DC voltage, and a capacitor configured to smooth the DC voltage converted by the converter. A single-phase AC power supply or a DC power supply is connected to two of the input terminals corresponding to any two of three phases of the converter while a passive element is provided to connect remaining one of the input terminals corresponding to a phase to which the single-phase AC power supply or the DC power supply is not connected, with one terminal of the capacitor.

According to the present invention, the idle circuit can be effectively used.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A power conversion apparatus according to the present invention will be described in detail hereinbelow in connection with a preferred embodiment with reference to the accompanying drawings.

Embodiment

Figure 1A:
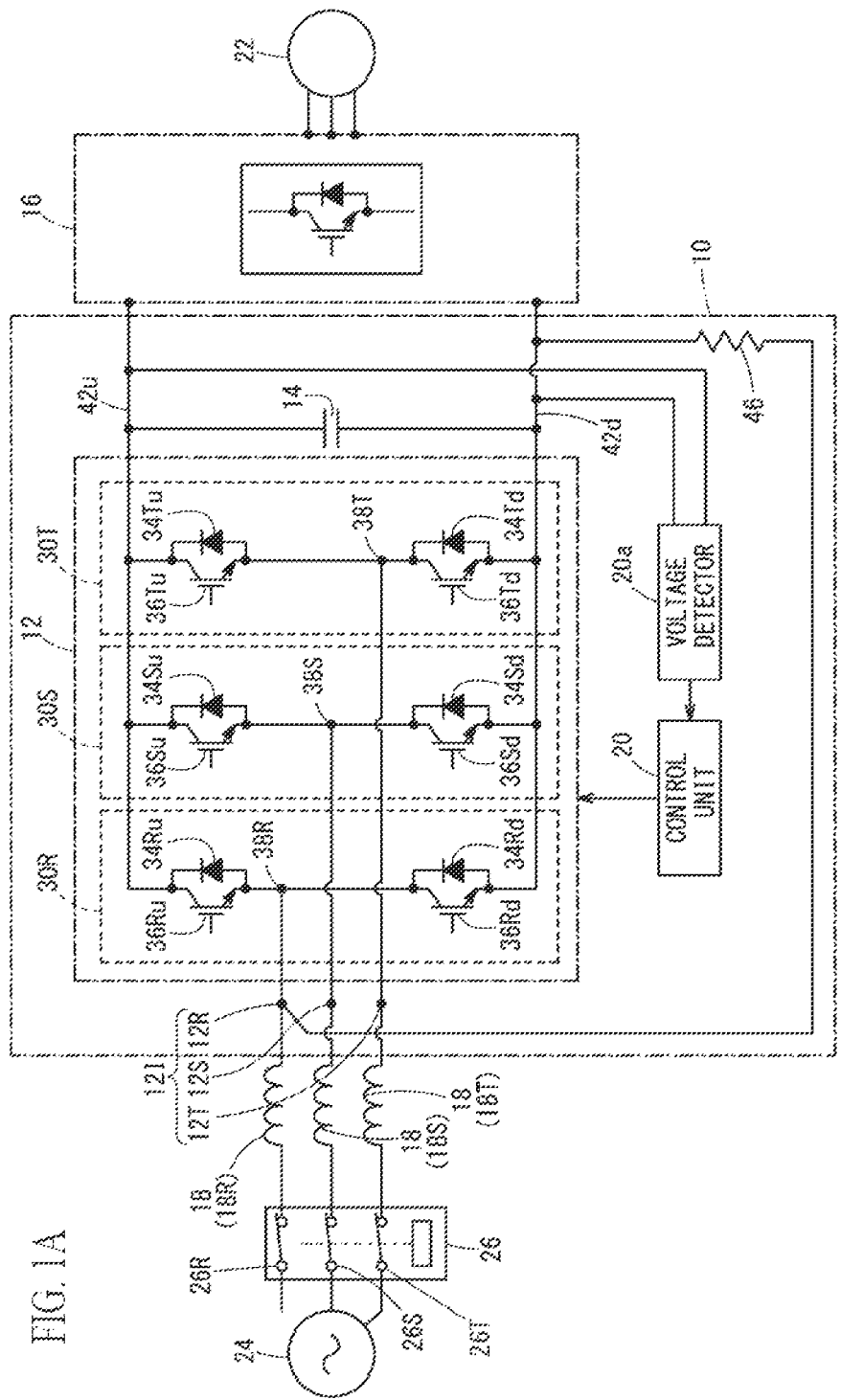
FIG. 1A is a circuit configuration diagram of a power conversion apparatus in an embodiment.

FIG. 1A is a circuit configuration diagram of a power conversion apparatus 10 according to an embodiment. The power conversion apparatus 10 includes a converter 12, a capacitor 14, a voltage detector 20a, and a control unit 20. The power conversion apparatus 10 converts electric power supplied from an AC power supply into DC power to supply power to an inverter 16 or generate regenerative energy and return the regenerated energy to the AC power supply. The inverter 16 converts DC power into AC power to supply power to a motor 22, or converts regenerative energy generated during deceleration of the motor 22 into DC power and supplies the DC power to the power conversion apparatus 10.

The converter 12 has input terminals 12R, 12S, 12T each corresponding to a different phase (R phase, S phase, T phase) of the three-phase AC power supply. The input terminals 12R, 12S, and 12T are collectively referred to as input terminals 12I. Reactors 18 (18R, 18S, 18T) are connected to the three input terminals 12R, 12S, 12T of the converter 12 on the power supply side, respectively.

A switch unit 26 is connected to the reactors 18 (18R, 18S, 18T). When input terminals 26R, 26S, 26T in the switch unit 26 are connected to the three-phase AC power supply, the switch unit 26 can turn on or off the connection between each phase of the three-phase AC power supply and the corresponding one of the reactors 18R, 18S, 18T. FIG. 1A shows a state in which the switch unit 26 is turned on.

In FIG. 1A, a single-phase AC power supply 24 is connected only to the input terminals 26S and 26T, so that the switch unit 26 can turn on or off the connection between the single-phase AC power supply 24 and the reactors 18S and 18T. In FIG. 1A, the single-phase AC power supply 24 is connected to the input terminals 12S and 12T corresponding to two phases (S-phase and T-phase) of the converter 12 via the switch unit 26 and the reactor 18 (18S, 18T).

The converter 12 includes power device units 30R, 30S, 30T, corresponding to respective phases (R phase, S phase, T phase) of the three-phase AC power supply.

The power device unit 30R corresponding to the R phase includes an upper arm diode 34Ru, a lower arm diode 34Rd, an upper arm switching element (semiconductor switching element) 36Ru, and a lower arm switching element 36Rd.

The power device unit 30S corresponding to the S phase includes an upper arm diode 34Su, a lower arm diode 34Sd, an upper arm switching element 36Su, and a lower arm switching element 36Sd.

The power device unit 30T corresponding to the T phase includes an upper arm diode 34Tu, a lower arm diode 34Td, an upper arm switching element 36Tu, and a lower arm switching element 36Td.

A reference numeral 34 is used to generically refer to the diodes 34Ru, 34Rd, 34Su, 34Sd, 34Tu, and 34Td. A reference numeral 34u is used to describe the upper arm diode in general, and a reference numeral 34d is used to describe the lower arm diode in general.

A reference numeral 36 is used to generically refer to the switching elements 36Ru, 36Rd, 36Su, 36Sd, 36Tu, and 36Td. Further, a reference numeral 36u is used to describe the switching elements on the upper arm side in general, and a reference numeral 36d is used to describe the switching elements on the lower arm side in general. The switching element 36 may be, for example, an insulated gate bipolar transistor (IGBT), but is not limited thereto. A field effect transistor (FET) may be used as the switching element 36.

The upper arm diode 34u and the lower arm diode 34d are connected in series with each other. The cathode of the upper arm diode 34u is connected to an output line 42u on the positive electrode side. The anode of the upper arm diode 34u is connected to the cathode of the lower arm diode 34d. The anode of the lower arm diode 34d is connected to an output line 42d on the negative electrode side.

The upper arm switching element 36u and the lower arm switching element 36d are connected in series with each other. The first terminal of the upper arm switching element 36u is connected to the cathode of the upper arm diode 34u. The second terminal of the upper arm switching element 36u is connected to the anode of the upper arm diode 34u. The first terminal of the lower arm switching element 36d is connected to the cathode of the lower arm diode 34d. The second terminal of the lower arm switching element 36d is connected to the anode of the lower arm diode 34d. When the switching element 36 is, for example, an IGBT, the first terminal is a collector and the second terminal is an emitter. When the switching element 36 is, for example, an FET, the first terminal is one of a source and a drain and the second terminal is the other of the source and the drain.

The anode of the upper arm diode 34Ru, the second terminal of the upper arm switching element 36Ru, the cathode of the lower arm diode 34Rd, and the first terminal of the lower arm switching element 36Rd are connected to a node 38R, which is connected to the input terminal 12R.

The anode of the upper arm diode 34Su, the second terminal of the upper arm switching element 36Su, the cathode of the lower arm diode 34Sd, and the first terminal of the lower arm switching element 36Sd are connected to a node 38S, which is connected to the input terminal 12S.

The anode of the upper arm diode 34Tu, the second terminal of the upper arm switching element 36Tu, the cathode of the lower arm diode 34Td, and the first terminal of the lower arm switching element 36Td are connected to a node 38T, which is connected to the input terminal 12T.

The control unit 20 controls the switching elements 36 so that the converter 12 converts the AC voltage of the three-phase AC power supply into a DC voltage. The converter 12 is, for example, a publicly known pulse width modulation (PWM) converter, but is not limited to this.

The capacitor 14 is provided on the downstream of the converter 12. One terminal of the capacitor 14 on the positive electrode side is connected to the output line 42u. The other terminal of the capacitor 14 on the negative electrode side is connected to the output line 42d. The capacitor 14 smooths the DC voltage converted by and output from converter 12.

The inverter 16 is connected to the output lines 42u and 42d, converts the DC voltage smoothed by the capacitor 14 into an AC voltage, and applies the AC voltage to the motor 22 to drive the motor 22.

The voltage detector 20a is connected to the output lines 42u and 42d to detect the voltage across the capacitor 14.

When the single-phase AC power supply 24 is connected to the power conversion apparatus 10 capable of converting electric power from a three-phase AC power supply, there is a problem that one of the power device units 30R, 30S and 30T is not connected to the single-phase AC power supply 24, resulting in a useless idle circuit. Other than this, there is an additional problem that regenerative energy generated by the motor 22 raises the voltage across the capacitor 14 to a higher level than needed.

To solve the above problems, in the power conversion apparatus 10 of the present embodiment, the input terminal 12I (12R, 12S, 12T) corresponding to the phase to which the single-phase AC power supply 24 is not connected is connected to one terminal of the capacitor 14 by way of a discharge resistor 46, while the control unit 20 controls the idle circuit.

In the example shown in FIG. 1A, the R-phase power device unit 30R corresponding to the input terminal 12R to which the single-phase AC power supply 24 is not connected is the idle circuit. Therefore, one end of the discharge resistor 46 is connected to the input terminal 12R corresponding to the R phase while the other end of the discharge resistor 46 is connected to the negative-side terminal of the capacitor 14 via the output line 42d.

When the voltage across the capacitor 14 detected by the voltage detector 20a exceeds a predetermined threshold, the control unit 20 turns on the upper arm switching element 36Ru connected to the input terminal 12R to which the single-phase AC power supply 24 is not connected. This discharges the electric charge accumulated in the capacitor 14 so that a current flows from the positive electrode of the capacitor 14 through the switching element 36Ru and the discharge resistor 46 in this order, to the negative electrode of the capacitor 14. As a result, surplus electric power can be consumed by the discharge resistor 46, whereby the voltage across the capacitor 14, which is higher than necessary, can be lowered, and the idle circuit can be effectively used.

Note that the other end of the discharge resistor 46, one end of which is connected to the input terminal 12R, may be connected to the terminal of the capacitor 14 on the positive electrode side via the output line 42u. In this case, the control unit 20 turns on the lower arm switching element 36Rd connected to the input terminal 12R to which the discharge resistor 46 is connected. Thereby, a current flows from the positive electrode of the capacitor 14 through the discharge resistor 46 and the switching element 36Rd in this order, to the negative electrode of the capacitor 14. As a result, surplus electric power is consumed by the discharge resistor 46, whereby the voltage across the capacitor 14 can be lowered, and the idle circuit can be effectively used.

While the control unit 20 performs the above control to cause the discharge resistor 46 to consume the surplus electric power, the control unit 20 may also control the switching elements 36Su, 36Sd and 36Tu, 36Td connected to the respective input terminals 12S and 12T so as to perform power regeneration of returning the regenerative energy generated by the motor 22 to the power supply side. This configuration enables effective use of the regenerative energy.

Further, in a case where even if the control unit 20 performs the control of power regeneration so as to return regenerative energy generated by the motor 22 to the power supply side, the voltage across the capacitor 14 exceeds the threshold due to the regenerative energy, the control unit 20 may perform control to cause the discharge resistor 46 to consume the surplus electric power.

As described above, the power conversion apparatus 10 can effectively utilize the power device unit 30R that is left as an idle circuit with the single-phase AC power supply 24 being unconnected.

Figure 1B:
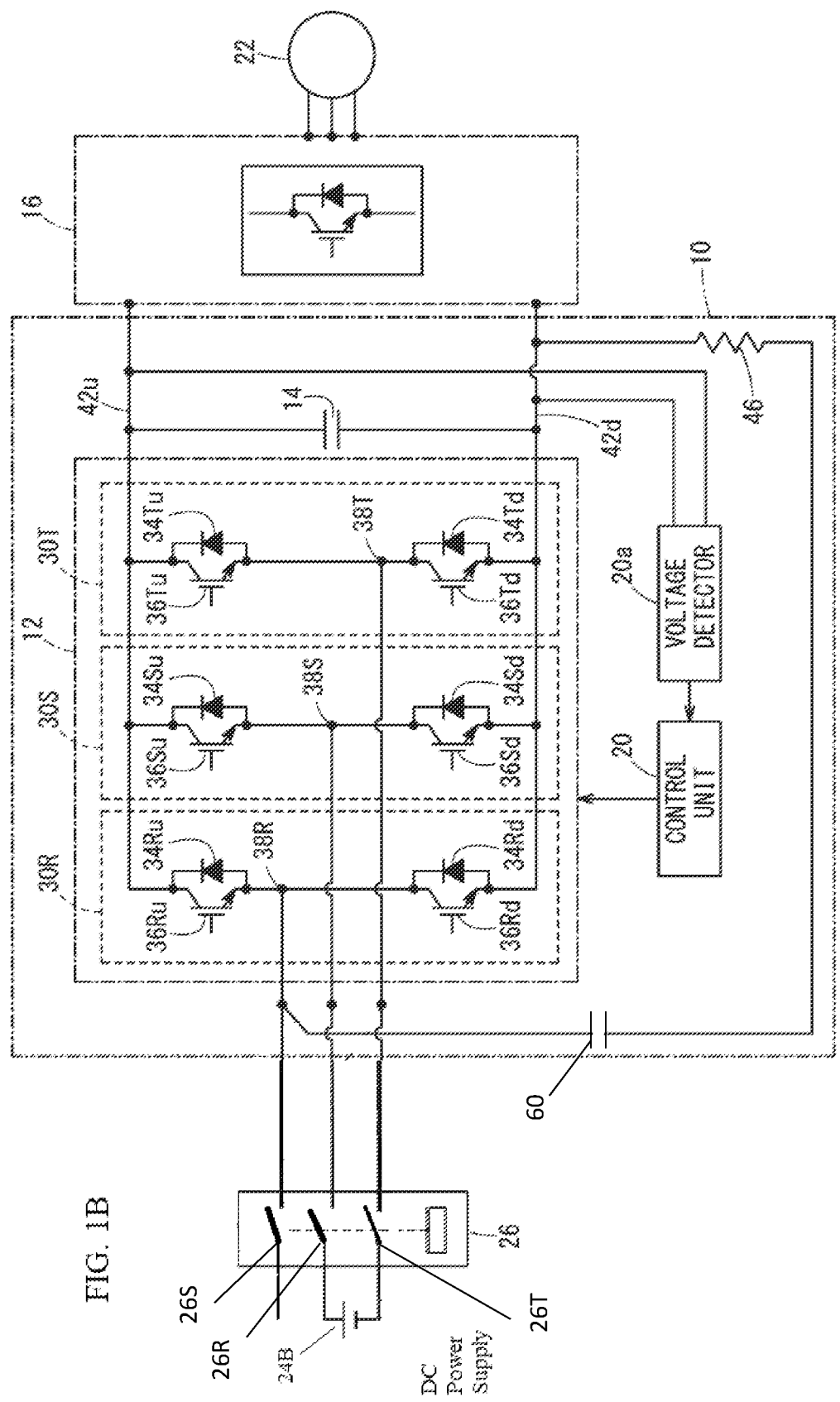
FIG. 1B is a circuit configuration diagram of a power conversion apparatus in an embodiment.

Referring to FIG. 1B, note that, instead of the single-phase AC power supply 24, a DC power supply 24B such as a battery may be connected to the input terminals 12S and 12T via the switch unit 26 and the reactor 18 (18S, 18T). Further, since the single-phase AC power supply 24 or the DC power supply 24B may and should be connected to two input terminals 12I corresponding to any two of the three phases of the converter 12, the aforementioned power supply may be connected to the input terminals 12R and 12T, or the input terminals 12R and 12S. Also in these cases, all that is needed is to insert the discharge resistor 46 between the remaining one input terminal 12I to which the single-phase AC power supply 24 or the DC power supply 24B is not connected and one terminal of the capacitor 14 on the positive electrode side or the negative electrode side. When the other end of the discharge resistor 46 is connected to the terminal of the capacitor 14 on the positive electrode side, the lower arm switching element 36d corresponding to the phase of the input terminal 12I, to which one end of the discharge resistor 46 is connected, is turned on so as to discharge the capacitor 14. When the other end of the discharge resistor 46 is connected to the terminal of the capacitor 14 on the negative electrode side, the upper arm switching element 36u corresponding to the phase of the input terminal 12I, to which one end of the discharge resistor 46 is connected, is turned on so as to discharge the capacitor 14. Further, the switch unit 26 and the reactor 18 may not be those for a three-phase AC power supply, but may be those for a single-phase AC power supply or for a DC power supply 24B, instead. Furthermore, the reactor 18 may be omitted, and the switch unit 26 may be directly connected to the input terminals 12R, 12S, and 12T.

[Modifications]

The above embodiment may be modified as follows.

(Modification 1)

Figure 2:
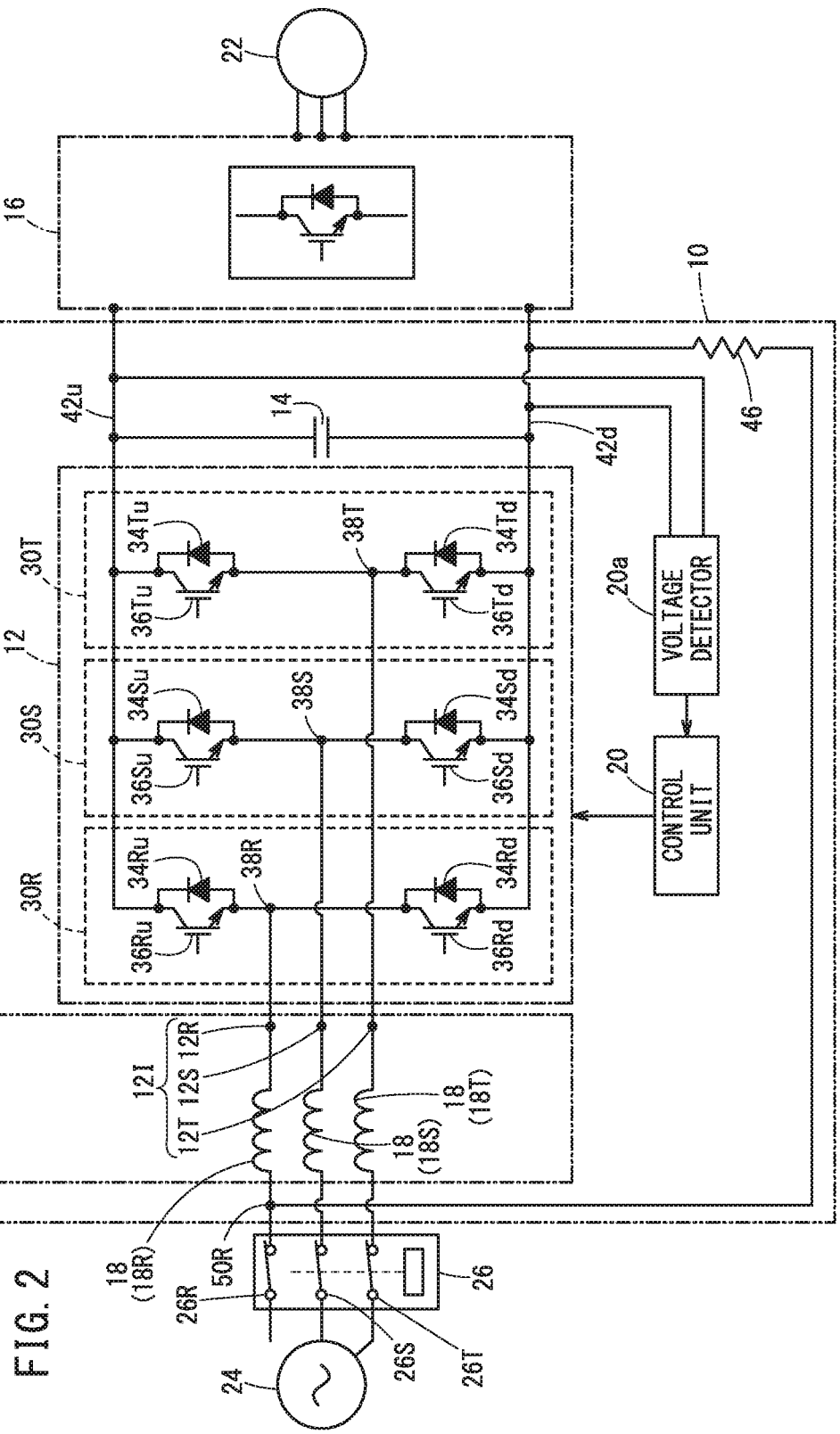
FIG. 2 is a circuit configuration diagram of a power conversion apparatus in a modification 1.

FIG. 2 is a circuit configuration diagram of a power conversion apparatus 10 in a modification 1. Unlike the above embodiment, in the modification 1, the discharge resistor 46, as a passive element, is inserted between the output line 42d and a power supply-side terminal, designated at 50R, of the reactor 18R that is connected to the input terminal 12R to which the single-phase AC power supply 24 is not connected. The operation of the power conversion apparatus 10 in the modification 1 is similar to that described in the above embodiment. Also in the modification 1, the power device unit 30R, which is an idle circuit, can be effectively used. In the case of the modification 1, a configuration may be adopted in which at least one of the reactors 18S and 18T is omitted so that the switch unit 26 is directly connected to the input terminals 12S and 12T. That is, all that is needed is to insert the reactor 18 (reactor 18R) between the input terminal 12I (input terminal 12R) corresponding to the phase of the idle circuit and the switch unit 26.

(Modification 2)

Figure 3:
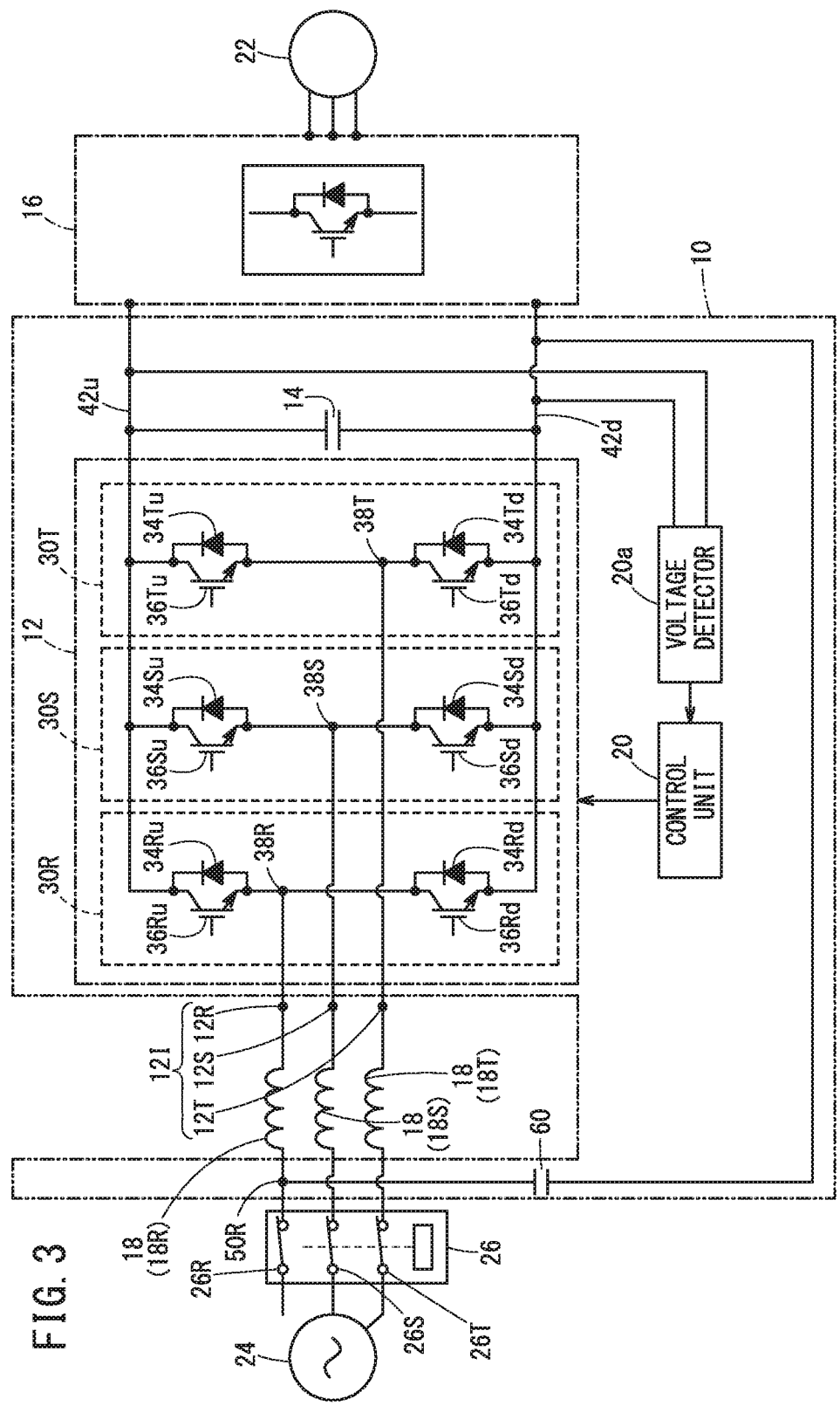
FIG. 3 is a circuit configuration diagram of a power conversion apparatus in in a modification 2.

FIG. 3 is a circuit configuration diagram of a power conversion apparatus 10 in a modification 2. Unlike the above embodiment, in the second modification, a storage capacitor 60, as a passive element, is inserted between the output line 42d and the power supply-side terminal 50R of the reactor 18R that is connected to the input terminal 12R to which the single-phase AC power supply 24 is not connected.

When the voltage across the capacitor 14 detected by the voltage detector 20a exceeds a predetermined threshold, the control unit 20 turns on the upper arm switching element 36Ru connected to the input terminal 12R. This discharges the electric charge accumulated in the capacitor 14 and charges the storage capacitor 60. At this time, the control unit 20 prohibits the control of switching elements 36Su, 36Sd and 36Tu, 36Td connected to the respective input terminals 12S and 12T to prevent power regeneration of returning the regenerative energy generated by the motor 22 to the power supply side. Thereby, the power conversion apparatus 10 can charge the storage capacitor 60 with surplus power by using the power device unit 30R that is the idle circuit. Thereafter, the energy stored in the storage capacitor 60 can be discharged and supplied to the inverter 16. In the initial operation of the motor drive device, a large current such as an inrush current is supplied from the single-phase AC power supply 24, but in the power conversion apparatus 10 of the modification 2, a current is also supplied from the storage capacitor 60. Therefore, the storage capacitor 60 functions as a peak shaving device that realizes peak shaving of the single-phase AC power supply 24. In the case of the modification 2, a configuration may be adopted in which at least one of the reactors 18S and 18T is omitted so that the switch unit 26 is directly connected to the input terminals 12S and 12T. That is, all that is needed is to insert the reactor 18 (reactor 18R) between the input terminal 12I (input terminal 12R) corresponding to the phase of the idle circuit and the switch unit 26.

Invention Obtained from the Embodiment

The inventions that can be understood from the above embodiment and modifications are described below.

A power conversion apparatus (10) includes: a converter (12) including input terminals (12I: 12R, 12S, 12T) and switching elements (36 (36u, 36d): 36Ru, 36Rd, 36Su, 36Sd, 36Tu, 36Td) corresponding to respective phases of a three-phase AC power supply, and configured to convert an AC voltage of the three-phase AC power supply into a DC voltage, and a capacitor (14) configured to smooth the DC voltage converted by the converter (12). A single-phase AC power supply (24) or a DC power supply is connected to two of the input terminals (12I: 12R, 12S, 12T) corresponding to any two of three phases of the converter (12) while a passive element is provided to connect remaining one of the input terminals (12I: 12R, 12S, 12T) corresponding to a phase to which the single-phase AC power supply (24) or the DC power supply is not connected, with one terminal of the capacitor (14).

With this configuration, it is possible to provide a circuit configuration capable of effectively using the idle circuit.

The power conversion apparatus (10) may further include: a voltage detector (20a) configured to detect a voltage across the capacitor (14); and a control unit (20) configured to control the switching elements (36 (36u, 36d): 36Ru, 36Rd, 36Su, 36Sd, 36Tu, 36Td) corresponding to respective phases of the converter (12). The control unit (20) may be configured to, when the voltage across the capacitor (14) exceeds a threshold, turn on the switching element (36 (36u, 36d): 36Ru, 36Rd, 36Su, 36Sd, 36Tu, 36Td) corresponding to a phase of the input terminal (12I: 12R, 12S, 12T) to which the single-phase AC power supply (24) or the DC power supply is not connected, so as to discharge an electric charge accumulated in the capacitor (14). This configuration makes it possible to lower the voltage across the capacitor (14) effectively using the idle circuit.

The power conversion apparatus may further include a reactor (18: 18R, 18S, 18T) connected to a power supply side of at least one of the three input terminals (12I: 12R, 12S, 12T) of the converter (12). The passive element may be a discharge resistor (46) and be provided to connect the input terminal (12I: 12R, 12S, 12T) side of the reactor (18: 18R, 18S, 18T) or the power supply side of the reactor (18: 18R, 18S, 18T), with one terminal of the capacitor (14).

The control unit (20) may be configured to turn on the switching element (36 (36u, 36d): 36Ru, 36Rd, 36Su, 36Sd, 36Tu, 36Td) corresponding to the phase of the input terminal (12I: 12R, 12S, 12T) to which the single-phase AC power supply (24) or the DC power supply is not connected, so as to discharge the electric charge accumulated in the capacitor (14), and control the switching elements (36 (36u, 36d): 36Ru, 36Rd, 36Su, 36Sd, 36Tu, 36Td) corresponding to the two phases to which the single-phase AC power supply (24) or the DC power supply is connected, so as to perform power regeneration. This configuration enables effective use of the regenerated electric power.

The power conversion apparatus may further include a reactor (18: 18R, 18S, 18T) connected to a power supply side of at least one of the three input terminals (12I: 12R, 12S, 12T) of the converter (12). The passive element may be a storage capacitor (60) and be provided to connect the power supply side of the reactor (18: 18R, 18S, 18T), with one terminal of the capacitor (14). This configuration makes it possible to charge the storage capacitor (60) using surplus electric power, and discharge the energy stored in the storage capacitor (60) and supply the energy to the inverter (16).

The control unit (20) may be configured to turn on the switching element (36 (36u, 36d): 36Ru, 36Rd, 36Su, 36Sd, 36Tu, 36Td) corresponding to the phase of the input terminal (12I: 12R, 12S, 12T) to which the single-phase AC power supply (24) or the DC power supply is not connected, so as to discharge the electric charge accumulated in the capacitor (14) and charge the storage capacitor (60), and may prohibit control of the switching elements (36 (36u, 36d): 36Ru, 36Rd, 36Su, 36Sd, 36Tu, 36Td) corresponding to the two phases to which the single-phase AC power supply (24) or the DC power supply is connected. This configuration enables preferential charging of the storage capacitor (60).

What is claimed is:

1. A power conversion apparatus comprising:
    a converter including:
        a first input terminal, a second input terminal, and a third input terminal, corresponding to three phases of a three-phase AC power supply; and
        switching elements corresponding to the first input terminal, the second input terminal, and the third input terminal, wherein the converter is configured to convert an AC voltage of the three-phase AC power supply into a DC voltage;
    a capacitor configured to smooth the DC voltage converted by the converter, wherein:
        each of the three phases of the three-phase AC power supply is connected respectively to the first input terminal, the second input terminal, and the third input terminal through power supply lines;
        in a case where a single-phase AC power supply or a DC power supply is used instead of the three-phase AC power supply, the single-phase AC power supply or the DC power supply is connected to the first input terminal and the second input terminal through the power supply lines; and
        one end of at least one passive element is directly coupled to one terminal of the capacitor, the at least one passive element connecting the third input terminal to which the single-phase AC power supply or the DC power supply is not connected, with the one terminal of the capacitor, and another end of the at least one passive element is directly coupled to one of the power supply lines that corresponds to the third input terminal.

2. The power conversion apparatus according to claim 1, further comprising:
    a voltage detector configured to detect a voltage across the capacitor; and
    a control unit configured to control the switching of the converter, wherein
    the control unit is configured to, when the voltage across the capacitor exceeds a threshold, turn on the switching element corresponding the third input terminal, so as to discharge an electric charge accumulated in the capacitor.

3. The power conversion apparatus according to claim 2, further comprising a reactor connected to a power supply side of the third input terminal, wherein the at least one passive element is a storage capacitor and is provided to connect a power supply side of the reactor with one terminal of the capacitor.

4. A power conversion apparatus comprising:
    a converter including:
        a first input terminal, a second input terminal, and a third input terminal, corresponding to three phases of a three-phase AC power supply; and
        switching elements corresponding to the first input terminal, the second input terminal, and the third input terminal, wherein the converter is configured to convert an AC voltage of the three-phase AC power supply into a DC voltage;
    a capacitor configured to smooth the DC voltage converted by the converter, wherein:
        in a case where a single-phase AC power supply or a DC power supply is used instead of the three-phase AC power supply, the single-phase AC power supply or the DC power supply is connected to the first input terminal and the second input terminal;
    at least one passive element is provided to connect the third input terminal to which the single-phase AC power supply or the DC power supply is not connected, with one terminal of the capacitor;
    a voltage detector configured to detect a voltage across the capacitor;
    a control unit configured to control the switching of the converter, wherein the control unit is configured to, when the voltage across the capacitor exceeds a threshold, turn on the switching element corresponding the third input terminal, so as to discharge an electric charge accumulated in the capacitor; and
    a reactor connected to a power supply side of the third input terminal, wherein
    the at least one passive element is a discharge resistor and is provided to connect a third input terminal side of the reactor or a power supply side of the reactor, with one terminal of the capacitor.

5. The power conversion apparatus according to claim 4, wherein the control unit is configured to turn on the switching element corresponding to the third input terminal, so as to discharge the electric charge accumulated in the capacitor, and control the switching elements corresponding to the first input terminal and the second input terminal, so as to perform power regeneration.

6. A power conversion apparatus comprising:
a converter including:
    a first input terminal, a second input terminal, and a third input terminal, corresponding to three phases of a three-phase AC power supply; and
    switching elements corresponding to the first input terminal, the second input terminal, and the third input terminal, wherein the converter is configured to convert an AC voltage of the three-phase AC power supply into a DC voltage;
a capacitor configured to smooth the DC voltage converted by the converter, wherein:
    in a case where a single-phase AC power supply or a DC power supply is used instead of the three-phase AC power supply, the single-phase AC power supply or the DC power supply is connected to the first input terminal and the second input terminal;
at least one passive element is provided to connect the third input terminal to which the single-phase AC power supply or the DC power supply is not connected, with one terminal of the capacitor;
a voltage detector configured to detect a voltage across the capacitor;
a control unit configured to control the switching of the converter, wherein the control unit is configured to, when the voltage across the capacitor exceeds a threshold, turn on the switching element corresponding the third input terminal, so as to discharge an electric charge accumulated in the capacitor; and
a reactor connected to a power supply side of the third input terminal, wherein the at least one passive element is a storage capacitor and is provided to connect a power supply side of the reactor with one terminal of the capacitor,
wherein the control unit is configured to turn on the switching element corresponding to the third input terminal, so as to discharge the electric charge accumulated in the capacitor and charge the storage capacitor, and prohibit control of the switching elements corresponding to the first input terminal and the second input terminal.

* * * * *